(12) United States Patent
Zhang et al.

(10) Patent No.: US 11,962,907 B2
(45) Date of Patent: Apr. 16, 2024

(54) VEHICLE-ROAD COOPERATION STREET LAMP FOR URBAN ROAD

(71) Applicant: HUNAN INSTITUTE OF ENGINEERING, Hunan (CN)

(72) Inventors: Xizheng Zhang, Hunan (CN); Zhangyu Lu, Hunan (CN); Qin Wan, Hunan (CN); Xiaofang Yuan, Hunan (CN); Zeyu Wang, Hunan (CN)

(73) Assignee: HUNAN INSTITUTE OF ENGINEERING, Hunan (CN)

(*) Notice: Subject to any disclaimer, the term of this patent is extended or adjusted under 35 U.S.C. 154(b) by 219 days.

(21) Appl. No.: 17/644,189

(22) Filed: Dec. 14, 2021

(65) Prior Publication Data
US 2022/0186917 A1 Jun. 16, 2022

(30) Foreign Application Priority Data
Dec. 14, 2020 (CN) .......................... 202011469155.1

(51) Int. Cl.
 *F21S 8/08* (2006.01)
 *H04N 23/695* (2023.01)
 *F21W 131/103* (2006.01)
(52) U.S. Cl.
 CPC .............. *H04N 23/695* (2023.01); *F21S 8/08* (2013.01); *F21W 2131/103* (2013.01)

(58) Field of Classification Search
CPC . H04N 23/695; H04N 7/18; F21S 8/08; F21S 9/035; F21W 2131/103; F21V 33/0052; Y02B 20/72; B08B 1/002; F16M 13/02; G08G 1/0175
See application file for complete search history.

(56) References Cited

FOREIGN PATENT DOCUMENTS

| CN | 108305474 A | * | 7/2018 | ............... B08B 1/04 |
|---|---|---|---|---|
| CN | 109410614 A | * | 3/2019 | |
| CN | 210462793 U | * | 5/2020 | |
| CN | 212677238 U | * | 3/2021 | |
| CN | 213395099 U | * | 6/2021 | |
| CN | 113932182 A | * | 1/2022 | |

* cited by examiner

*Primary Examiner* — Kimberly T Wood
(74) *Attorney, Agent, or Firm* — M&B IP Analysts, LLC.

(57) ABSTRACT

Provided is a vehicle-road cooperation street lamp for an urban road. The vehicle-road cooperation street lamp for an urban road comprises a vehicle-road cooperation street lamp body, wherein a first supporting plate is transversely arranged on the front side of the top of the vehicle-road cooperation street lamp body, a transmission cavity is transversely formed in the first supporting plate, a first electric telescopic rod is transversely arranged in the inner cavity of the transmission cavity and located on the outer wall of the vehicle-road cooperation street lamp body, and a rack plate is transversely arranged on the front side of the first electric telescopic rod and located in the transmission cavity.

10 Claims, 3 Drawing Sheets

VEHICLE-ROAD COOPERATION STREET LAMP FOR URBAN ROAD

CROSS REFERENCE TO RELATED APPLICATION(S)

This patent application claims the benefit and priority of Chinese Patent Application No. 202011469155.1, filed on Dec. 14, 2020, the disclosure of which is incorporated by reference herein in its entirety as part of the present application.

TECHNICAL FIELD

The present disclosure relates to the field of vehicle-road cooperation street lamps, in particular to a vehicle-road cooperation street lamp for an urban road.

BACKGROUND ART

According to vehicle-road cooperation, advanced wireless communication, new-generation Internet, and other technologies are adopted, vehicle-vehicle and vehicle-road dynamic real-time information interaction are comprehensively implemented, vehicle active safety control and road cooperation management are carried out on the basis of full-space-time dynamic traffic information collection and fusion, effective cooperation of people, vehicles and roads is fully achieved, traffic safety is guaranteed, and the traffic efficiency is improved, so that a safe, efficient and environment-friendly road traffic system is formed.

For example, in the patent with the publication number of CN210462793U, provided is an intelligent street lamp based on vehicle-road cooperation, comprising a base, wherein a lamp pole is fixedly connected to the base, a control box is arranged outside the lamp pole, a cantilever arm connected with the lamp pole is further arranged on the top of the lamp pole, an illuminating lamp and at least two camera devices are arranged on the cantilever arm, a communication assembly and a processor which are connected with each other are arranged in the control box, the communication assembly is connected with the camera device, and the communication assembly is in wireless communication with a network side and a terminal within a preset distance of the intelligent street lamp. Wireless communication with the network side and the terminal within the preset distance of the intelligent street lamp is established through the communication assembly; on one hand, a shot picture can be transmitted to the terminal equipment within the preset distance, meanwhile, the radar is combined to detect the overspeed equipment within the preset distance, and a deceleration prompt is sent to the overspeed equipment; and on the other hand, environment information, traffic condition information and prompt information can be displayed through a displayer.

However, because the camera devices are difficult to rotate, the shooting range is narrow, running vehicles are difficult to capture accurately, when the vehicle speed is high, the situation that a shot image is not clear is likely to occur, and in addition, when a street lamp needs to be cleaned after being used for a long time, the existing street lamps need to be cleaned manually generally. As the street lamp is generally high, certain potential safety hazards exist in the cleaning process, time and labor are wasted, and the working efficiency is low.

Therefore, it is necessary to provide a vehicle-road cooperation street lamp for an urban road to solve the technical problem.

SUMMARY

The present disclosure provides a vehicle-road cooperation street lamp for an urban road, and solves the problems that the camera shooting range is narrow, running vehicles are difficult to capture accurately, certain potential safety hazards exist when lamps are cleaned, time and labor are wasted, and the working efficiency is low.

In order to solve the technical problems, the vehicle-road cooperation street lamp for an urban road comprises a vehicle-road cooperation street lamp body, wherein a first supporting plate is transversely arranged on the front side of the top of the vehicle-road cooperation street lamp body, a transmission cavity is transversely formed in the first supporting plate, a first electric telescopic rod is transversely arranged in the inner cavity of the transmission cavity and located on the outer wall of the vehicle-road cooperation street lamp body, a rack plate is transversely arranged on the front side of the first electric telescopic rod and located in the transmission cavity, a first rotating rod is rotatably and vertically arranged in the transmission cavity in a penetrating mode, a rotating gear meshed with the rack plate is arranged at the bottom of the first rotating rod, a camera is arranged at the other end of the first rotating rod and located above the first supporting plate, a lamp is transversely arranged below the first supporting plate, a second supporting plate is transversely arranged on the front side of the vehicle-road cooperation street lamp body and located below the first supporting plate, a threaded lead screw is rotatably and transversely arranged above the second supporting plate, a motor for the threaded lead screw to rotate is arranged on the top of the second supporting plate and located on the front side of the vehicle-road cooperation street lamp body, a lead screw sleeve is movably arranged on the surface of the threaded lead screw, a cleaning rod is vertically arranged on the top of the lead screw sleeve, and the surface of the cleaning rod is fixedly sleeved with a cleaning brush capable of being attached to the lamp.

Preferably, a slideway is transversely formed in the top of the second supporting plate, and a sliding block fixedly connected with the lead screw sleeve is slidably arranged in the slideway.

Preferably, a third supporting plate is transversely arranged on the rear side of the vehicle-road cooperation street lamp body, a steering rod is vertically arranged in the middle of the top of the third supporting plate, and a solar cell panel is rotatably arranged on the steering rod through a bearing.

Preferably, a second electric telescopic rod is vertically arranged on the top of the third supporting plate and located on one side of the steering rod, a pull rope movably connected with the solar cell panel is arranged on the top of the second electric telescopic rod, and an elastic piece fixedly connected with the third supporting plate is arranged on the front side of the bottom of the solar cell panel.

Preferably, a first transmission rod is vertically arranged on the top of the camera, the surface of the first transmission rod is fixedly sleeved with a driving wheel, a supporting piece is arranged on the front side of the top of the first supporting plate, a second transmission rod is rotatably and vertically arranged in the supporting piece through a bearing, and a driven wheel connected with the driving wheel through a belt is arranged on the surface of the second transmission rod.

Preferably, a third electric telescopic rod is vertically arranged at the bottom of the second transmission rod, a cleaning sleeve is arranged at the bottom of the third electric telescopic rod, and a clean brush is arranged on the inner wall of the cleaning sleeve.

Preferably, the inner diameter of the clean brush is matched with the outer diameter of the cleaning brush, and the cleaning rod and the cleaning sleeve are horizontally arranged.

Preferably, a supporting frame is arranged at the bottom of the third supporting plate and is obliquely arranged.

Preferably, a plurality of groups of climbing frames are arranged on the front side of the surface of the vehicle-road cooperation street lamp body.

Preferably, threaded grooves are formed in the front side of the surface of the vehicle-road cooperation street lamp body and located below the second supporting plate, and the climbing frames are fixedly connected with the vehicle-road cooperation street lamp body through the threaded grooves.

Compared with the prior art, the vehicle-road cooperation street lamp for an urban road provided by the present disclosure has the following beneficial effects:

According to the vehicle-road cooperation street lamp for an urban road provided by the present disclosure, when the arranged first electric telescopic rod works, the rack plate is driven to move, when the rack plate moves, the rotating gear is driven to rotate, when the rotating gear moves, the camera is driven to rotate through the first rotating rod, and the shooting range can be adjusted through the rotation of the camera, so that the shooting accuracy is improved, all information of vehicles can be shot more clearly, and the accuracy is improved. In addition, when the motor works, the threaded lead screw can be driven to rotate, when the threaded lead screw rotates, the cleaning rod can be driven to move through the lead screw sleeve, and when the cleaning rod moves, the surface of the lamp can be cleaned through the cleaning brush. Therefore, the situation that cleaning personnel need to climb to a high place for cleaning is avoided, potential safety hazards are avoided, and the practicability can be improved.

Reference signs: 1, vehicle-road cooperation street lamp body; 2, first supporting plate; 3, transmission cavity; 4, first electric telescopic rod; 5, rack plate; 6, first rotating rod; 7, rotating gear; 8, camera; 9, lamp; 10, second supporting plate; 11, threaded lead screw; 12, motor; 13, lead screw sleeve; 14, first cleaning brush; 15, slideway; 16, sliding block; 17, third supporting plate; 18, steering rod; 19, solar cell panel; 20, second electric telescopic rod; 21, pull rope; 22, elastic piece; 23, first transmission rod; 24, driving wheel; 25, supporting piece; 26, second transmission rod; 27, third electric telescopic rod; 28, cleaning sleeve; 29, second cleaning brush; 30, climbing frame; 31, cleaning rod; 32, bearing; 33, threaded groove; 34, driven wheel; 35, belt; and 36, supporting frame.

DETAILED DESCRIPTION OF THE EMBODIMENTS

The description of the present disclosure is further described in conjunction with the attached figures and embodiments.

Figure 1:
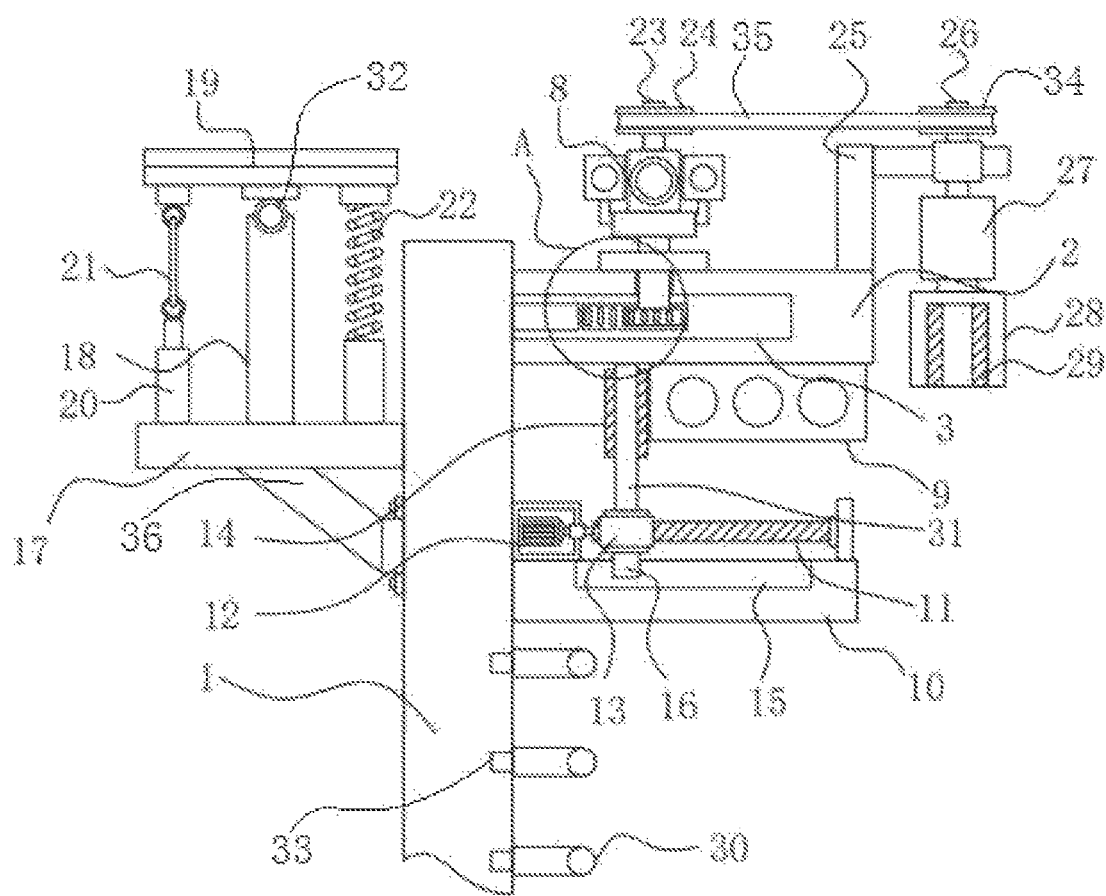
FIG. 1 is a structural schematic diagram of a preferred embodiment of a vehicle-road cooperation street lamp for an urban road provided by the present disclosure.
Figure 2:
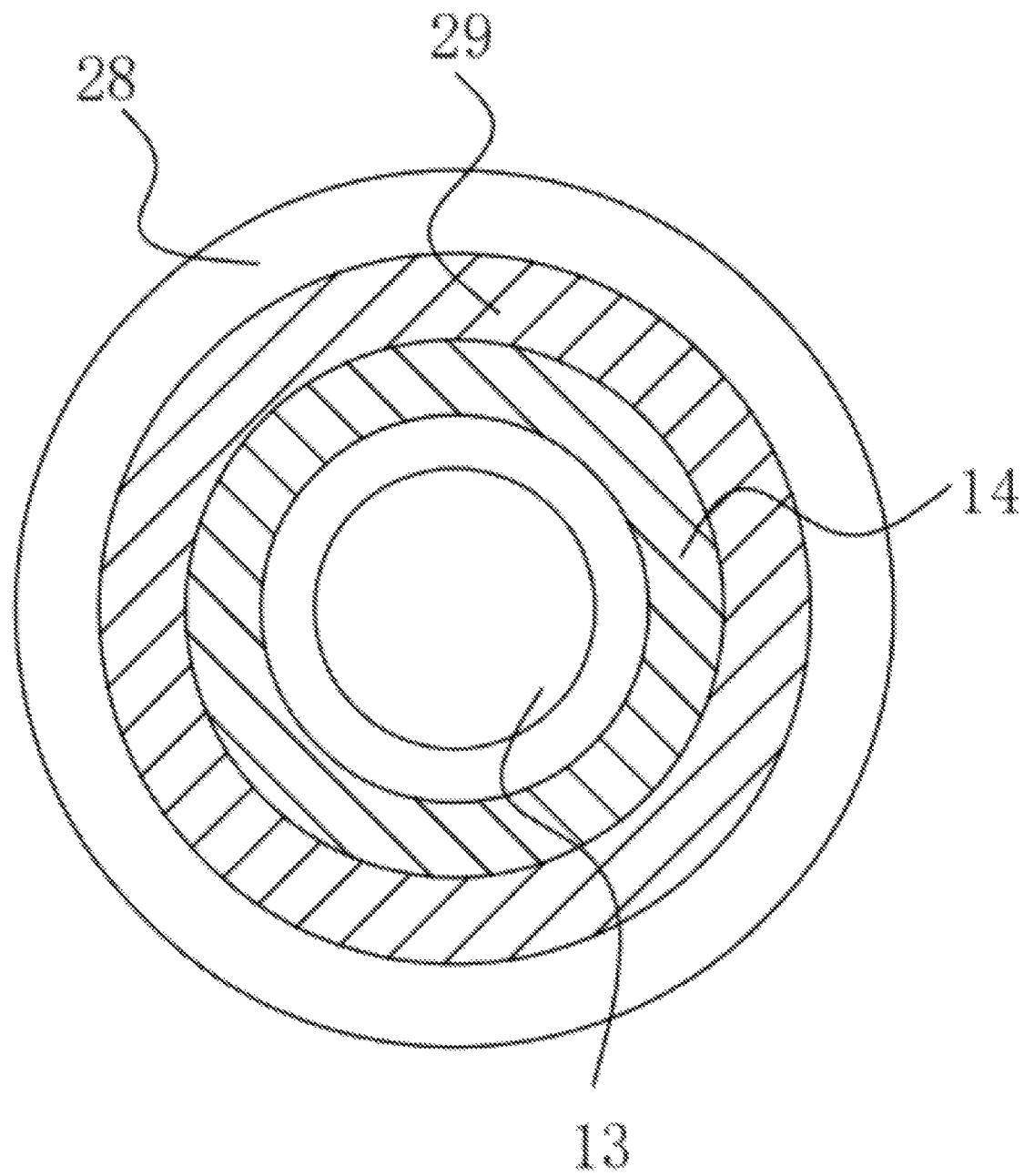
FIG. 2 is an upward structural schematic diagram of a cleaning sleeve as shown in FIG. 1.
Figure 3:
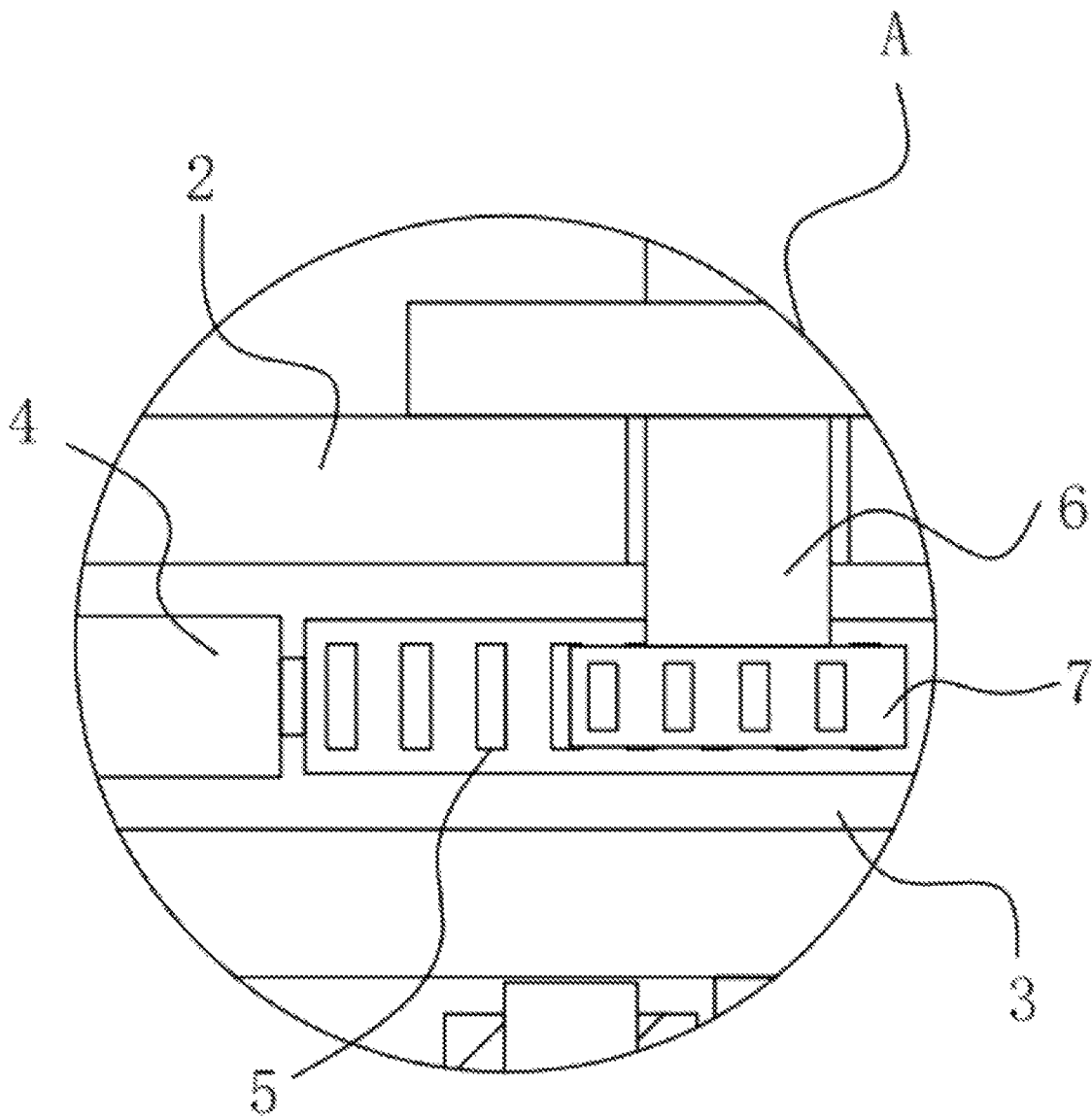
FIG. 3 is an enlarged structural schematic diagram of part A in FIG. 1.

Referring to FIG. 1, FIG. 2 and FIG. 3, FIG. 1 is a structural schematic diagram of a preferred embodiment of a vehicle-road cooperation street lamp for an urban road provided by the present disclosure; FIG. 2 is an upward structural schematic diagram of a cleaning sleeve as (28) shown in FIG. 1; and FIG. 3 is an enlarged structural schematic diagram of part A in FIG. 1. The vehicle-road cooperation street lamp for an urban road comprises a vehicle-road cooperation street lamp body 1, wherein a first supporting plate 2 is transversely arranged on the front side of the top of the vehicle-road cooperation street lamp body 1, a transmission cavity 3 is transversely formed in the first supporting plate 2, the arranged first supporting plate 2 can play a role in supporting, and transmission can be performed in the transmission cavity 3.

A first electric telescopic rod 4 is transversely arranged in the inner cavity of the transmission cavity 3 and located on the outer wall of the vehicle-road cooperation street lamp body 1, a rack plate 5 is transversely arranged on the front side of the first electric telescopic rod 4 and located in the transmission cavity 3, a first rotating rod 6 is rotatably and vertically arranged in the transmission cavity 3 in a penetrating mode, a rotating gear 7 meshed with the rack plate 5 is arranged at the bottom of the first rotating rod 6, and a camera 8 is arranged at the other end of the first rotating rod 6 and located above the first supporting plate 2.

When the first electric telescopic rod 4 works, the rack plate 5 is driven to move, when the rack plate 5 moves, the rotating gear 7 is driven to rotate, when the rotating gear 7 rotates, the first rotating rod 6 is driven to rotate, when the first rotating rod 6 rotates, the camera 8 is driven to rotate, and the shooting range can be adjusted through the rotation of the camera 8, so that the shooting accuracy is improved.

A lamp 9 is transversely arranged below the first supporting plate 2, a second supporting plate 10 is transversely arranged on the front side of the vehicle-road cooperation street lamp body 1 and located below the first supporting plate 2, a threaded lead screw 11 is rotatably and transversely arranged above the second supporting plate 10, a motor 12 for the threaded lead screw 11 to rotate is arranged on the top of the second supporting plate 10 and located on the front side of the vehicle-road cooperation street lamp body 1, a lead screw sleeve 13 is movably arranged on the surface of the threaded lead screw 11, a cleaning rod 31 is vertically arranged on the top of the lead screw sleeve 13, and the surface of the cleaning rod 31 is fixedly sleeved with a first cleaning brush 14 capable of being attached to the lamp 9.

When the arranged first cleaning brush 14 works, the threaded lead screw 11 can be driven to rotate, when the threaded lead screw 11 rotates, the lead screw sleeve 13 can be driven to move, when the lead screw sleeve 13 moves, the cleaning rod 31 can be driven to move, when the cleaning rod 31 moves, the surface of the lamp 9 can be cleaned through the first cleaning brush 14, and therefore, self-cleaning is achieved, manual cleaning is avoided, the working efficiency is improved, and the installation hidden danger is reduced.

A slideway 15 is transversely formed in the top of the second supporting plate 10, a sliding block 16 fixedly connected with the lead screw sleeve 13 is slidably arranged in the slideway 15, and the arranged slideway 15 can drive the sliding block 16 to move when the lead screw sleeve 13 moves, so that the stability of the lead screw sleeve 13 in the moving process is improved.

A third supporting plate 17 is transversely arranged on the rear side of the vehicle-road cooperation street lamp body 1, a steering rod 18 is vertically arranged in the middle of the top of the third supporting plate 17, a solar cell panel 19 is rotatably arranged on the steering rod 18 through a bearing 32, the arranged third supporting plate 17 can play a role in supporting, and the arranged solar cell panel 19 can save energy, so that the practicability is improved.

A second electric telescopic rod 20 is vertically arranged on the top of the third supporting plate 17 and located on one side of the steering rod 18, a pull rope 21 movably connected with the solar cell panel 19 is arranged on the top of the second electric telescopic rod 20, and an elastic piece 22 fixedly connected with the third supporting plate 17 is arranged on the front side of the bottom of the solar cell panel 19.

When the second electric telescopic rod 20 works, the solar cell panel 19 is pulled by the pull rope 21 to change the angle, and the surface of the solar cell panel 19 can face the direction of the sun all the time through the change of the angle, so that the backlight condition is avoided, and the practicability is improved.

A first transmission rod 23 is vertically arranged on the top of the camera 8, the surface of the first transmission rod 23 is fixedly sleeved with a driving wheel 24, a supporting piece 25 is arranged on the front side of the top of the first supporting plate 2, a second transmission rod 26 is rotatably and vertically arranged in the supporting piece 25 through a bearing, and a driven wheel 34 connected with the driving wheel 24 through a belt 35 is arranged on the surface of the second transmission rod 26.

When the arranged camera 8 rotates, the first transmission rod 23 is driven to rotate, when the first transmission rod 23 rotates, the driven wheel 34 is driven to rotate through the driving wheel 24, and when the driven wheel 34 rotates, the second transmission rod 26 is driven to rotate.

A third electric telescopic rod 27 is vertically arranged at the bottom of the second transmission rod 26, a cleaning sleeve 28 is arranged at the bottom of the third electric telescopic rod 27, a second cleaning brush 29 is arranged on the inner wall of the cleaning sleeve 28, when the third electric telescopic rod 27 rotates, the second cleaning brush 29 can be driven to rotate through the cleaning sleeve 28, and the solar cell panel 19 can be cleaned through rotating the second cleaning brush 29, the condition of excessive dust accumulation when the first cleaning brush 14 works for a long period of time is avoided, and the arranged third electric telescopic rod 27 can move the cleaning sleeve 28 downwards when being started, so that the first cleaning brush 14 moved to a designated position can be wrapped.

The inner diameter of the second cleaning brush 29 is matched with the outer diameter of the first cleaning brush 14, and the cleaning rod 31 and the cleaning sleeve 28 are horizontally arranged, so that dust in the first cleaning brush 14 can be conveniently treated.

A supporting frame 36 is arranged at the bottom of the third supporting plate 17 and is obliquely arranged, the arranged supporting frame 36 can improve the stability of the third supporting plate 17, and the oblique arrangement can enhance the firmness.

A plurality of groups of climbing frames 30 are arranged on the front side of the surface of the vehicle-road cooperation street lamp body 1, and maintenance personnel can climb the vehicle-road cooperation street lamp main body 1 through the arranged climbing frames 30, so that the practicability is improved.

Threaded grooves 33 are formed in the front side of the surface of the vehicle-road cooperation street lamp body 1 and located below the second supporting plate 10, the climbing frames 30 are fixedly connected with the vehicle-road cooperation street lamp body 1 through the threaded grooves 33, and due to the fact that installation is performed through the threaded grooves 33, disassembly and replacement are convenient.

The working principle of the vehicle-road cooperation street lamp for an urban road provided by the present disclosure is as follows:

When the shooting angle of the camera 8 needs to be adjusted, firstly, the first electric telescopic rod 4 is started, the first electric telescopic rod 4 works, the rack plate 5 is driven to move, when the rack plate 5 moves, the rotating gear 7 is driven to rotate, when the rotating gear 7 rotates, the first rotating rod 6 is driven to rotate, and when the first rotating rod 6 rotates, the camera 8 is driven to rotate, so that the shooting range can be adjusted through the rotation of the camera 8; when the surface of the lamp 9 needs to be cleaned, the motor 12 is started firstly, and when the motor 12 works, the threaded lead screw 11 is driven to rotate; when the threaded lead screw 11 rotates, the lead screw sleeve 13 is driven to move through the slideway 15 and the sliding block 16, when the lead screw sleeve 13 moves, the cleaning rod 31 is driven to move, when the cleaning rod 31 moves, the first cleaning brush 14 is driven to clean the surface of the lamp 9, and when the angle of the solar cell panel 19 needs to be adjusted, the second electric telescopic rod 20 works to pull the pull rope 21 so that the solar cell panel 19 rotates, and therefore, the change of the angle is completed; when the other side of the solar cell panel 19 needs to be adjusted, the pull rope 21 is lifted and loosened through the second electric telescopic rod 20, and the solar cell panel 19 rotates through elastic deformation of the elastic piece 22; when the first cleaning brush 14 needs to be cleaned, the first cleaning brush 14 is moved to a position below the cleaning sleeve 28 through the movement of the screw rod sleeve 13, then the surface of the first cleaning brush 14 is wrapped with the cleaning sleeve 28 through the third electric telescopic rod 27, and the first cleaning brush 14 can be cleaned through the angle change of the camera 8, so that the practicability is improved.

Compared with the prior art, the vehicle-road cooperation street lamp for an urban road provided by the present disclosure has the following beneficial effects:

When the arranged first electric telescopic rod 4 works, the rack plate 5 is driven to move, when the rack plate 5 moves, the rotating gear 7 is driven to rotate, when the rotating gear 7 moves, the camera 8 is driven to rotate through the first rotating rod 6, and the shooting range can be adjusted through the rotation of the camera 8, so that the shooting accuracy is improved, all information of vehicles can be shot more clearly, and the accuracy is improved. In addition, when the motor 12 works, the threaded lead screw 11 can be driven to rotate, when the threaded lead screw 11 rotates, the cleaning rod 31 can be driven to move through the lead screw sleeve 13, and when the cleaning rod 31 moves, the surface of the lamp 9 can be cleaned through the first cleaning brush 14. Therefore, the situation that cleaning personnel need to climb to a high place for cleaning is avoided, potential safety hazards are avoided, and the practicability can be improved.

The above are only the embodiments of the present disclosure and not intended to limit the patent scope of the present disclosure, and any equivalent structures or equivalent flow transformations based on the specification and the attached figures of the present disclosure, which is directly or indirectly applied in other related technical fields, shall similarly fall within the scope of patent protection of the present disclosure.

What is claimed is:

1. A vehicle-road cooperation street lamp for an urban road, comprising a vehicle-road cooperation street lamp body (1), wherein a first supporting plate (2) is transversely arranged on a front side of a top of the vehicle-road cooperation street lamp body (1), a transmission cavity (3) is transversely formed in the first supporting plate (2), a first electric telescopic rod (4) is transversely arranged in an inner cavity of the transmission cavity (3) and located on an outer wall of the vehicle-road cooperation street lamp body (1), a rack plate (5) is transversely arranged on a front side of the first electric telescopic rod (4) and located in the transmission cavity (3), a first rotating rod (6) is rotatably and vertically arranged in the transmission cavity (3) in a penetrating mode, a rotating gear (7) meshed with the rack plate (5) is arranged at a bottom of the first rotating rod (6), a camera (8) is arranged at another end of the first rotating rod (6) and located above the first supporting plate (2), a lamp (9) is transversely arranged below the first supporting plate (2), a second supporting plate (10) is transversely arranged on the front side of the vehicle-road cooperation street lamp body (1) and located below the first supporting plate (2), a threaded lead screw (11) is rotatably and transversely arranged above the second supporting plate (10), a motor (12) for the threaded lead screw (11) to rotate is arranged on a top of the second supporting plate (10) and located on the front side of the vehicle-road cooperation street lamp body (1), a lead screw sleeve (13) is movably arranged on a surface of the threaded lead screw (11), a cleaning rod (31) is vertically arranged on a top of the lead screw sleeve (13), and a surface of the cleaning rod (31) is fixedly sleeved with a first cleaning brush (14) capable of being attached to the lamp (9).

2. The vehicle-road cooperation street lamp for an urban road according to claim 1, wherein a slideway (15) is transversely formed in the top of the second supporting plate (10), and a sliding block (16) fixedly connected with the lead screw sleeve (13) is slidably arranged in the slideway (15).

3. The vehicle-road cooperation street lamp for an urban road according to claim 1, wherein a third supporting plate (17) is transversely arranged on a rear side of the vehicle-road cooperation street lamp body (1), a steering rod (18) is vertically arranged in a middle of a top of the third supporting plate (17), and a solar cell panel (19) is rotatably arranged on the steering rod (18) through a bearing (32).

4. The vehicle-road cooperation street lamp for an urban road according to claim 3, wherein a second electric telescopic rod (20) is vertically arranged on the top of the third supporting plate (17) and located on one side of the steering rod (18), a pull rope (21) movably connected with the solar cell panel (19) is arranged on a top of the second electric telescopic rod (20), and an elastic piece (22) fixedly connected with the third supporting plate (17) is arranged on a front side of the bottom of the solar cell panel (19).

5. The vehicle-road cooperation street lamp for an urban road according to claim 1, wherein a first transmission rod (23) is vertically arranged on a top of the camera (8), a surface of the first transmission rod (23) is fixedly sleeved with a driving wheel (24), a supporting piece (25) is arranged on the front side of a top of the first supporting plate (2), a second transmission rod (26) is rotatably and vertically arranged in the supporting piece (25), and a driven wheel (34) connected with the driving wheel (24) through a belt (5 is arranged on a surface of the second transmission rod (26).

6. The vehicle-road cooperation street lamp for an urban road according to claim 5, wherein a third electric telescopic rod (27) is vertically arranged at a bottom of the second transmission rod (26), a cleaning sleeve (28) is arranged at a bottom of the third electric telescopic rod (27), and a second cleaning brush (29) is arranged on an inner wall of the cleaning sleeve (28).

7. The vehicle-road cooperation street lamp for an urban road according to claim 6, wherein an inner diameter of the second cleaning brush (29) is matched with an outer diameter of the first cleaning brush (14), and the cleaning rod (31) and the cleaning sleeve (28) are horizontally arranged.

8. The vehicle-road cooperation street lamp for an urban road according to claim 3, wherein a supporting frame (36) is arranged at a bottom of the third supporting plate (17) and is obliquely arranged.

9. The vehicle-road cooperation street lamp for an urban road according to claim 1, wherein a plurality of groups of climbing frames (30) are arranged on the front side of the surface of the vehicle-road cooperation street lamp body (1).

10. The vehicle-road cooperation street lamp for an urban road according to claim 9, wherein threaded grooves (33) are formed in the front side of the surface of the vehicle-road cooperation street lamp body (1) and located below the second supporting plate (10), and the climbing frames (30) are fixedly connected with the vehicle-road cooperation street lamp body (1) through the threaded grooves (33).

* * * * *